United States Patent
Seal et al.

(10) Patent No.: US 7,103,451 B2
(45) Date of Patent: *Sep. 5, 2006

(54) METHOD AND SYSTEM FOR SPATIALLY VARIABLE RATE APPLICATION OF AGRICULTURAL CHEMICALS BASED ON REMOTELY SENSED VEGETATION DATA

(75) Inventors: Michael R. Seal, Picayune, MS (US); Kenneth Brown Hood, Gunnison, MS (US); Mark David Lewis, Long Beach, MS (US); James William Johnson, Slidell, LA (US); Patrick Jackson, Cleveland, MS (US); Matthew Peterson, Cleveland, MS (US); Kelly Dupont, Cleveland, MS (US); Hendrick Van Riessen, Cleveland, MS (US)

(73) Assignee: InTime, Inc., Cleveland, MS (US)

(*) Notice: Subject to any disclaimer, the term of this patent is extended or adjusted under 35 U.S.C. 154(b) by 0 days.

This patent is subject to a terminal disclaimer.

(21) Appl. No.: 10/709,945

(22) Filed: Jun. 8, 2004

(65) Prior Publication Data
US 2005/0149235 A1    Jul. 7, 2005

Related U.S. Application Data

(63) Continuation-in-part of application No. 10/222,898, filed on Aug. 19, 2002, now Pat. No. 6,813,544.

(51) Int. Cl.
*G05D 11/02*    (2006.01)

(52) U.S. Cl. .................. 700/284; 702/5; 382/110
(58) Field of Classification Search ............ 700/284, 700/287; 702/5; 382/110; 706/928; 701/50; 111/118; 47/48.5
See application file for complete search history.

(56) References Cited

U.S. PATENT DOCUMENTS

| | | | |
|---|---|---|---|
| 5,220,876 A | 6/1993 | Monson et al. | |
| 5,334,987 A | 8/1994 | Teach | |
| 5,467,271 A | * 11/1995 | Abel et al. .................... | 702/5 |
| 5,689,418 A | * 11/1997 | Monson ...................... | 706/928 |
| 5,704,546 A | 1/1998 | Henderson et al. | |
| 5,878,371 A | 3/1999 | Hale et al. | |
| 5,913,915 A | 6/1999 | McQuinn | |
| 5,919,242 A | 7/1999 | Greatline et al. | |

(Continued)

*Primary Examiner*—Albert W. Paladini
(74) *Attorney, Agent, or Firm*—Butler, Snow, O'Mara, Stevens & Cannada, PLLC

(57) ABSTRACT

Remotely sensed spectral image data are used to develop a Vegetation Index file which represents spatial variations of actual crop vigor throughout an area that is under cultivation. The latter information is processed to place it in a format that can be used by personnel to correlate and calibrate it with actually observed crop conditions existing at control points within the area. Based on the results, personnel formulate a prescription request, which is forwarded to a central processing site, where the prescription is prepared. The latter is returned to a mobile application means that directly applies inputs to the field at a spatially variable rate.

32 Claims, 15 Drawing Sheets

U.S. PATENT DOCUMENTS

| | | |
|---|---|---|
| 5,938,709 A | 8/1999 | Hale et al. |
| 5,995,895 A | 11/1999 | Watt et al. |
| 6,108,590 A | 8/2000 | Hergert |
| 6,141,614 A | 10/2000 | Janzen et al. |
| 6,160,902 A | 12/2000 | Dickson et al. |
| 6,178,253 B1 * | 1/2001 | Hendrickson et al. ...... 382/110 |
| 6,199,000 B1 | 3/2001 | Keller et al. |
| 6,236,907 B1 | 5/2001 | Hauwiller et al. |
| 6,266,432 B1 | 7/2001 | Wiens |
| 6,336,066 B1 | 1/2002 | Pellenc et al. |
| RE37,574 E | 3/2002 | Rawlins |
| 6,366,681 B1 | 4/2002 | Hutchins |
| 6,466,321 B1 | 10/2002 | Satake et al. |
| 6,522,948 B1 | 2/2003 | Benneweis |
| 6,529,615 B1 | 3/2003 | Hendrickson et al. |
| 6,549,851 B1 | 4/2003 | Greensides |
| 6,596,996 B1 * | 7/2003 | Stone et al. ............. 250/358.1 |
| 6,597,991 B1 | 7/2003 | Meron et al. |
| 6,606,542 B1 | 8/2003 | Hauwiller et al. |
| 6,678,580 B1 | 1/2004 | Benneweis |
| 6,683,970 B1 | 1/2004 | Satake et al. |
| 6,708,080 B1 | 3/2004 | Benneweis |
| 6,813,544 B1 * | 11/2004 | Hood et al. ................ 700/284 |
| 2004/0034450 A1 | 2/2004 | Seal et al. |

* cited by examiner

METHOD AND SYSTEM FOR SPATIALLY VARIABLE RATE APPLICATION OF AGRICULTURAL CHEMICALS BASED ON REMOTELY SENSED VEGETATION DATA

CROSS-REFERENCE TO RELATED APPLICATION

This application is a continuation-in-part application of prior U.S. application Ser. No. 10/222,898 now U.S. Pat. No. 6,813,544.

BACKGROUND OF INVENTION

The present invention is directed to a method and apparatus for promoting uniform healthy development of a growing crop by providing a variable rate application of agricultural chemicals, including fertilizer and pesticides, such as insecticides, fungicides and herbicides, to a crop. In particular, the invention provides a method for achieving optimized crop development using a minimum necessary amount of agricultural inputs, adapted specifically to spatial variations in crop vigor.

Systems for variable rate application of fertilizer to a field which is under cultivation are known. For example, U.S. Pat. No. 5,220,876 discloses a variable rate fertilizer spreading apparatus that uses a soil map, (which may be acquired, for example, from an aerial infrared photograph), in order to determine the amount of fertilizer that is to be applied at each location within the field. For this purpose, a map is prepared (referred to as a "fertilizer map"), which shows a spatially distributed desired fertilizer level throughout the field, as well as a "status" map which shows corresponding existing fertilizer distribution throughout the field. The desired distribution of fertilizer as recorded in the "fertilizer map" is prepared in advance, based on determined physical characteristics of the field itself, including field topography, soil type, drainage, sun exposure, and the like. In order to provide for application of the proper amount of fertilizer to achieve the desired distribution, an "Expert System" utilizes artificial intelligence to perform the necessary calculations, based on the fertilizer map, the status map, the soil type and the types of chemicals that are being applied.

In a prescription forming control system disclosed in U.S. Pat. No. 5,919,242, a navigation controller controls the delivery rate of agricultural products by an applicator vehicle, as a function of the global position of the vehicle, based on digital maps which divide a field into "zones", according for example to soil types. Several different products are delivered at differing rates depending on the soil content and the types of crops that are being cultivated. Similarly, U.S. Pat. No. 5,913,915 also discloses a multidispensing rate applicator for agricultural products in which a computerized control system stores a digital soil map containing information concerning the location of types of soils, topographic features, nutrient levels, soil compaction, drainage and the like. A map coordinate system allows for variable input control from side to side relative to the movement of the applicator system.

U.S. Pat. No. 6,199,000B1 provides a precision farming method in which seeding, cultivating and/or harvesting operations are controlled using GPS technology in conjunction with a digital map of an agricultural field, which may be created using satellite, aircraft or other overhead imagery. High resolution photographs acquired in this manner are used to generate the digital map. According to this disclosure, relevant information can then be stored in the map (location of irrigation systems, previous planting locations of other crops and the like), and used to determine, for example, the location at which new crops/seeds should be planted.

Similar systems, in which soil characteristic maps are used to control automated agricultural machines are disclosed in U.S. Pat. Nos. 6,236,907 B1; 6,336,066 BI and 6,141,614.

Each of the above prior art systems is based on the premise that the likely development of a crop planted in a particular field (and therefore the amount of nutrients which should be added in order to achieve optimum plant growth) can be calculated based on physical soil and field conditions, such as the type of soil, topography, drainage, existing nutrient levels, compaction, etc. Accordingly, such information concerning soil and field conditions is stored in the form of a map or maps, which are then used to determine an optimum distribution of fertilizer or the like, based on complex, in some cases proprietary, algorithms. (See, for example, U.S. Pat. No. 5,220,876 at Column 8, lines 58 et seq.).

Such systems share the common deficiency that they reflect only the soil and other physical field characteristics, and in some instance the type of crop being cultivated. While these may be reasonable prognosticators of likely crop development, they do not and cannot take into account or adjust for actual crop growth due, for example, to the effects of weather, diseases, insects and the like. Nor can they take into account the effects of weather on the materials themselves after they have been applied—such as for example due to heavy rains and attendant runoff. They are also generally incapable of generating time variable dynamic crop prescriptions based on actual crop development throughout the growing season.

SUMMARY OF INVENTION

Accordingly, it is an object of the present invention to provide a method and system for controlling a spatially variable rate delivery apparatus for applying agricultural chemicals to a growing crop in a cultivated field which dynamically takes into account actual crop development throughout the growing season. (As used herein, the term "spatially variable rate" means that the rate at which agricultural chemicals are applied varies as a function of geographic position, and includes so called "on/off" systems, in which the application is varied between zero ("off") and a fixed application rate ("on"), depending on position.). In addition to traditionally cultivated fields, the cultivated field can be an area such as a lawn, pasture, golf course, orchard or tract of growing timber. In addition to traditional "row" crops, the crop may include vegetables, nuts, fruits, legumes, grass, timber, ornamentals and any other managed plants.

Another object of the invention is to provide such a method and system for controlling application rates for agricultural chemicals, which automatically takes into account the effects of weather, disease and insects on crop development.

Another object of the invention is to provide such a system which is responsive to the effects of weather on the agricultural chemicals themselves, after they have been applied.

Yet another object of the invention is to provide a system that can be used to control application rates for pesticides, including herbicides, insecticides and fungicides, in addition to fertilizers.

Still a further object of the invention is to provide a system that can be correlated with ground truth information for accurate decision making.

Another object of the invention is to eliminate the necessity of storing large volumes of soil status information in the form of multilayer maps, as well as the need for complex calculations based on such maps. (It is of course apparent that such additional "layers" of information may prove useful, and may therefore be used optionally.)

These and other objects and advantages are achieved by the method and system according to the invention, in which remotely sensed spectral image data are used to develop a Vegetation Index image that represents spatial variations of actual crop vigor throughout an area that is under cultivation. Such a Vegetation Index may, for example, be a conventional "Normalized Difference Vegetation Index", or any other band combination which yields spatially resolved information regarding the vigor of existing vegetation. Moreover, as used herein, the term "spectral image data" encompasses all types of spectrally resolved image data, including data sets that are conventionally referred to as "multispectral" and "hyperspectral" imagery, as well as any equivalent spectrally resolved image data, such as thermal imagery.

The latter information is processed to place it in a format that can be used by an individual, who scouts the area to correlate and calibrate it with actually observed crop conditions existing at control points within an area of interest. Based on the results, personnel formulate a prescription request, which is forwarded via email (or other communications medium) or entered into a web based application to a central processing site, where the prescription is prepared. The latter is returned via email (or other medium) or entered into a web based application accessible by on site personnel, who can load it into a controller on a mobile applicator means that directly applies inputs to an area.

Other objects, advantages and novel features of the present invention will become apparent from the following detailed description of the invention when considered in conjunction with the accompanying drawings.

DETAILED DESCRIPTION

The present invention is directed to a method and apparatus for promoting uniform healthy development of a growing crop by providing a variable rate application of agricultural chemicals, including fertilizer and pesticides, such as insecticides, fungicides and herbicides, to a crop. In particular, the invention provides a method for achieving optimized crop development using a minimum necessary amount of agricultural chemicals, applied according to spatial variations in crop vigor.

The term "crops" in addition to traditional crops such as, soybeans and cotton, can include vegetables, tree fruits, nuts, legumes, timber, ornamentals, cultivated grass and any other plant the growth of which is managed or tended out of doors. Cultivated grass includes grass that is tended and which receives agriculture inputs, such as a fertilizer. Cultivated grass includes turfgrass found on a golf course, grass species in a pasture, grass species cultivated for their edible seeds or as forage, such as *Enchinochloa* or *Chloris gayana* and sod. Similarly, cultivated grass includes a lawn which is a field of cultivated and mowed grass. The on-site scout may be, in the case of a golf course, the superintendent or golf course manager. If the site is a residential lawn, the scout is the home owner or gardener. The term "area" can include fields that are orchards which produce pistachios, almonds, grapes, citrus groves and oranges.

Figure 1:
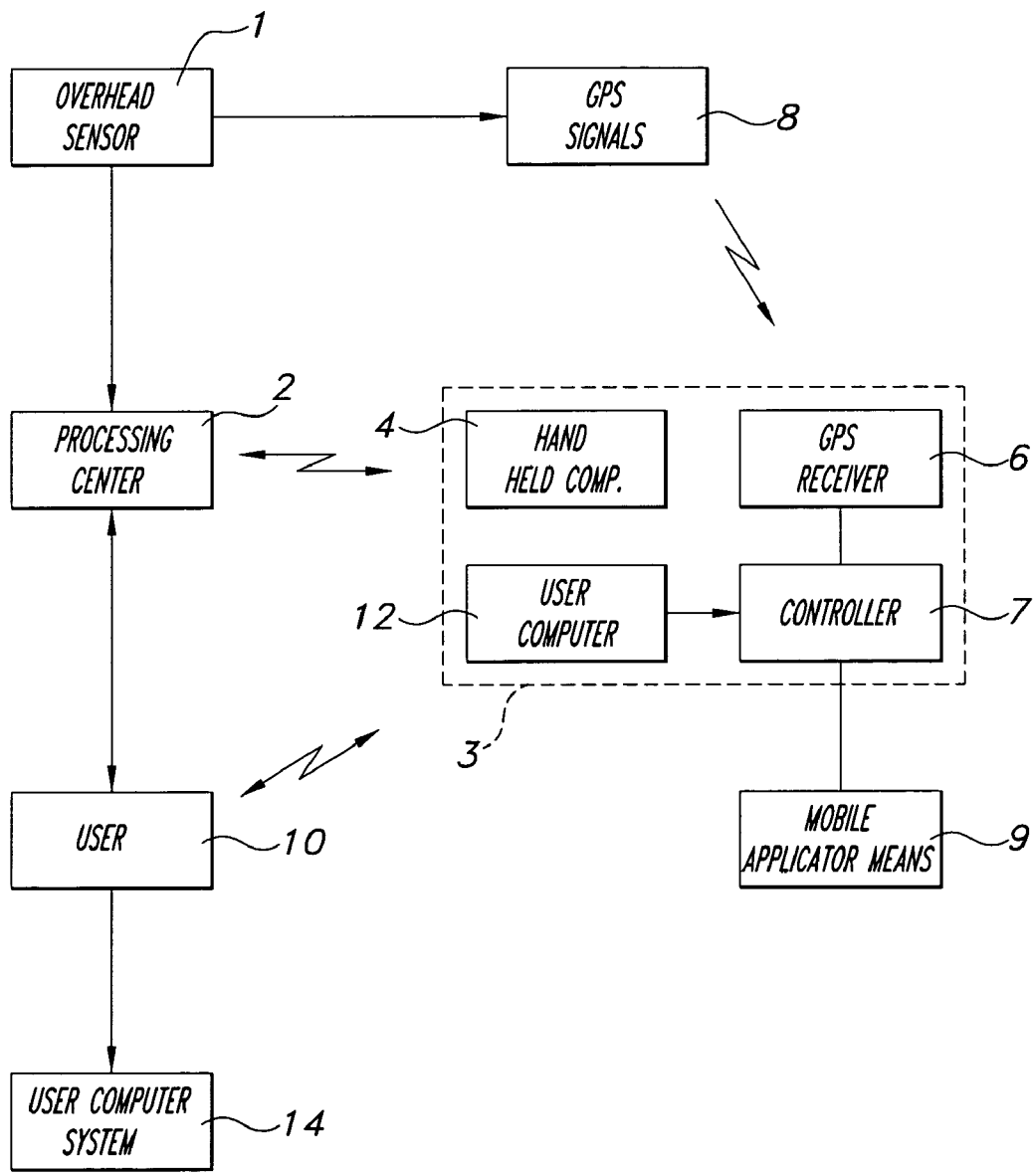
FIG. 1 is a conceptual schematic illustration of the components of a variable rate system for applying nutrients and agricultural chemicals to a cultivated field according to the invention.

FIG. 1 shows the principal components of the variable rate delivery system according to the invention. It includes an overhead sensor 1 that acquires digital spectral image data. (The overhead sensor may be for example a satellite or airborne remote sensing system.) These spectral image data are forwarded to a processing center 2, where they are processed into a form that can be used by on site scout, and where prescriptions are prepared in response to prescription requests, all as described in more detail below. The processing center 2 includes a server computer system 16. A service provider processes the spectral data and creates a prescription at the processing center 2. A processing software such as iCROP (In Time, Cleveland, Miss.) or SST (SST Development, Stillville, Okla.) can be used. The server computer system 16 at the processing center 2 can be connected to a user computer system onsite 12, user off site computer system 14, or directly to controller 7 on mobile applicator means 9 via an electronic data network. An electronic data network is any type of network environment from which at least one coupled computer or computer system is configured to receive content, such as HTML and related work wide web content and to process the same to produce an appropriate output. An exemplary electronic data network is the Internet along with the world wide web. The term computer system includes at least one computer with communication hardware, such as a modem. The server computer system 16 hosts a web site that facilitates the processing/retrieval of information for a user.

Transmitting a product request by a user 10 may include any and all communication methods whether in person, remotely, or automatically where information required for the process to be complete is communicated from the user 10 to the processing center 2. These communication methods may include, but are not limited to, use of an internet-based form, electronic mail, courier, or telephone. Moreover this process may be automated such that no request event need be established by the user 10 to product an information product, whether by prior arrangement between the user and service provider or instantiated by the service provider without involvement of the user. A product request is defined as any information required by the system to initiate and carry out generation of an information product. The user 10 can include a user computer system 14 which includes software to maintain a standard web browser.

An information product is defined as any data, whether electronic or in hard copy, used by a user 10 to perform a task. Transmission of information products to the user and/or user apparatus may include any and all communication methods in which said product may be transmitted to the user 10. These methods may include, but are not limited to, internet-based transmission, electronic transmission, or storage on a device and delivery by conventional mail or other courier, or conversion to print media and delivery. In one embodiment there is a secure internet connection between the user computer system 14 and the server computer system 16.

The process described need not be arranged between a user 10 and processing center 2. The entire process may be carried out by a user 10 of the provider such that no communication between the service provider and user 10 occurs. In this case, the service provider would be a vendor of the software necessary to carry out the process. The processing center 2 can be utilized in a way that is totally independent of processing center personnel interaction when developing a scout or prescription product for a user 10. When a User 10 enters the website hosted on the server computer system 16 and requests a product, the web based processing software automatically processes the user 10 request and makes the product available for download or transfer to mobile applicator means 9, hand held computer 4, onsite user computer 12, or offsite user computer 14. The processing center 2 tracks all requests and all products generated for easy reference and archiving purposes. Various web based methods and systems are known in the art. See e.g., Gobin U.S. Pat. No. 6,745,229; Balasubramaniam, et al. U.S. Pat. No. 6,701,441; and Pasquali U.S. Pat. No. 6,658,419.

Transmission of requests and information products that occur electronically may be transmitted via wired or wireless technology including, but not limited to, radio or Infrared frequencies using any communication protocol.

The processing center 2 posts the prescription on a web site or uses wireless means to directly transfer the prescription to the user 10. A product is requested via a web site, processing occurs at the service provider's centralized processing center 2, then the user 10 downloads the completed product directly to his controller 7 on a mobile application means 9, such as a spray rig or a user may have a wireless network configured on site 3, and use Bluetooth or infrared communication between the controller 7 on his sprayer and user's computer system on site 12. The mobile application means 9 includes, for example, tractor, lawn mower, or an airplane.

Alternatively, a hand held computer 4 that is configured properly with wireless transfer equipment may communicate directly with process center 2 to request product without needing any type of physical connection. A controller 7 found on spraying apparatus that is equipped with similar wireless transfer equipment may also communicate directly with processing center 2 to request and download product directly into controller 7 without need for any type of physical connection. Products will be requested via wireless communication (or other communication medium) directly from user 10 hand held computer or controller 7 positioned in the cab of a spraying apparatus. The crop input is delivered at a spatially variable rate based on the prescription and on GPS signals transmitted from a GPS system 8 and received by GPS receiver 6.

Figure 1A:
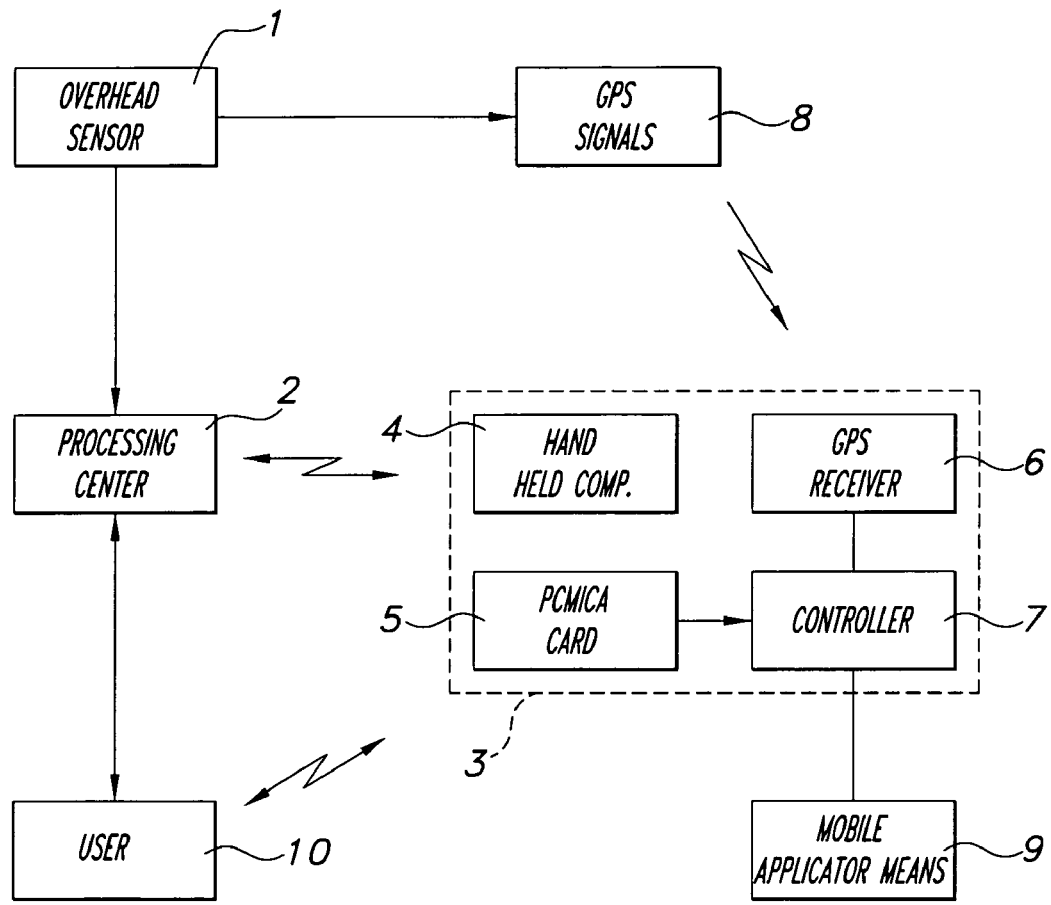
FIG. 1A is a conceptual schematic illustration of the components of a variable rate system for applying nutrients and agricultural chemicals to a cultivated field according to the invention.

In another embodiment shown in FIG. 1A, on site 3, a hand held computer 4 is used to receive processed data from the processing center 2 and to enter and process the results of an actual local inspection ("scouting") of existing crops in order to formulate a prescription request.

Prescriptions received from the processing center 2 are loaded onto a media transfer device, such as PCMICA cards 5 that are inserted into a controller 7 which controls a mobile applicator means 9, based on the prescription and on GPS signals transmitted from a GPS system 8 and received by GPS receiver 6.

Figure 2:
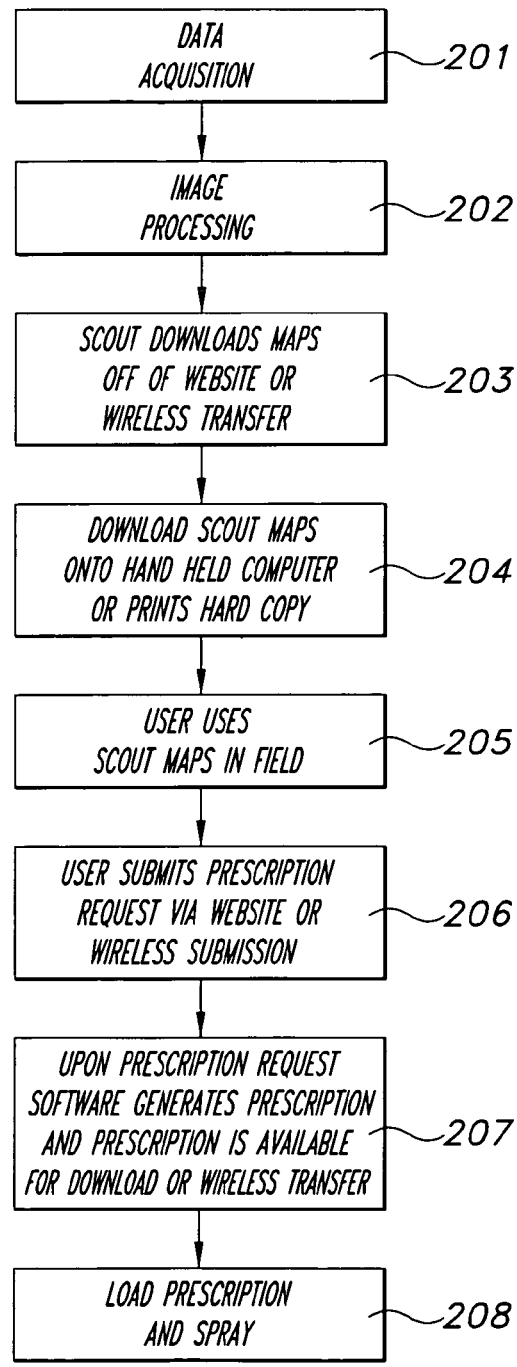
FIG. 2 is a flow chart that illustrates the variable rate application process implemented by the invention.

As shown in FIG. 2, in step 201, spectral image data are collected by satellite in space or aircraft flying over the customer's area of interest. More specifically, the aircraft can be an unmanned airborne vehicle (UAV) or a fixed wing aircraft. The collected images may be multispectral, hyperspectral or thermal images. The images have high spatial resolution, typically in the range of one to two meters. This high resolution imagery is needed to capture significant detail and variation over the turf. Aircraft data may be collected, for example, from an aircraft based sensor flying over an agriculture field. (Many such sensors are suitable for this purpose. One example is an RDACS sensor, but the invention is not limited to the use of any particular sensor.) The sensor stores the information in frames, each of which contains a plurality of frequency bands. For example, in one embodiment each frame has four bands: a band collecting data from the green region of the light spectrum at 540 nanometers, two bands collecting data from the red region of the light spectrum at 675 and 695 nanometers and a band collecting data from the infrared region of the light spectrum at 840 nanometers. Each frame contains columns and rows of pixels (for example, 1320 columns and 1035 rows), and there is geographic overlap from frame to frame. The amount of overlap is governed by the speed of the aircraft and the distance between flight lines. The image frames are written to any suitable storage medium, such as 8 mm or other tape, disks, etc. In addition, the image frames may be transmitted to processing center 2 directly from aerial platform utilizing wireless transmission technology. A processing software, such as iCROP (In time, Cleveland, Miss.) or SST (SST Development, Stillville, Okla.) may also be utilized aboard an aircraft where automated georeferencing technology may be capable of georeferencing the image data as it is collected real time. In addition, the real-time georeferenced image data could then be transferred directly to processing center 2 without landing the aerial platform.

The storage medium may be delivered to the processing center 2 on the day of the mission or by next day delivery via air courier. Alternatively, data may be transmitted from the aircraft to the processing center electronically. Satellite data may be purchased from an appropriate supplier and delivered either electronically or by next day delivery via air courier.

When the raw image data are received at the processing center 2, they are processed (Step 202) to place them in a form which is useable by the scout. It is useful to classify this process into two stages: pre-processing and processing.

Depending on the type of instrument by which the data were collected the pre-processing steps may include, for example, georectification, masking and data export. These pre-processing steps include manual tasks and also automated tasks. The output of the pre-processing tasks provides calibrated output files that are cropped to the field boundaries. The following is an example of preprocessing steps which may be performed depending on the type of sensor that is used to collect the data.

First, the data are written onto a disk, and a process is run to extract the second band of each frame, which is exported to TIFF format and stored in a gray scale image. The analyst uses these images to create a "Field-to-Frame" list, which pairs the fields with the frames that contain them, indexed by the order that they appear on the tape. Also, this inspection is used to determine the quality of the data. The three band images, stored in TIFF format, are extracted from the removable hard drive, and the frames are inspected to determine the image quality, and to verify that all of the necessary images are present.

Georectification. In the georectification process, the analyst picks control points between the raw frames and the reference image of the research area. The reference image is stored in the UTM coordinate system, which locates exactly where any pixel of the reference image is on the earth. By picking control points and transforming the raw data to this same coordinate system, each pixel in the image frame can be located by its UTM location. This manual georectification process is performed on all the frames that contain the fields. Although currently manual georectification is utilized, new advances in automated georectification software will allow this process to become more streamlined and manual interpretation of image data may not be needed in all cases.

Exporting. After georeferencing is completed, the image frames, if necessary, are exported to a data format that can be read by the software. The most common format is GeoTIFF.

After pre-processing is completed, the data must be transformed into a form that will allow decisions to be made. In a preferred embodiment of the invention, this information may be a Normalized Difference Vegetation Index (NDVI), or any other Vegetation Index which shows spatial variation of the crop vigor of the plant. Each pre-processed field data file needs to be transformed into an NDVI image; and other information products need to be generated to support the use of the data in the experiment.

Creation of Vegetation Index Images. After preis completed, a polygon field boundary is used to mask out the field images. A software program is then used to loop through these input files to automatically generate the vegetation indices and other data files. This image is stored as a floating-point binary raster. In a preferred embodiment, the NDVI index is used.

Figure 3:
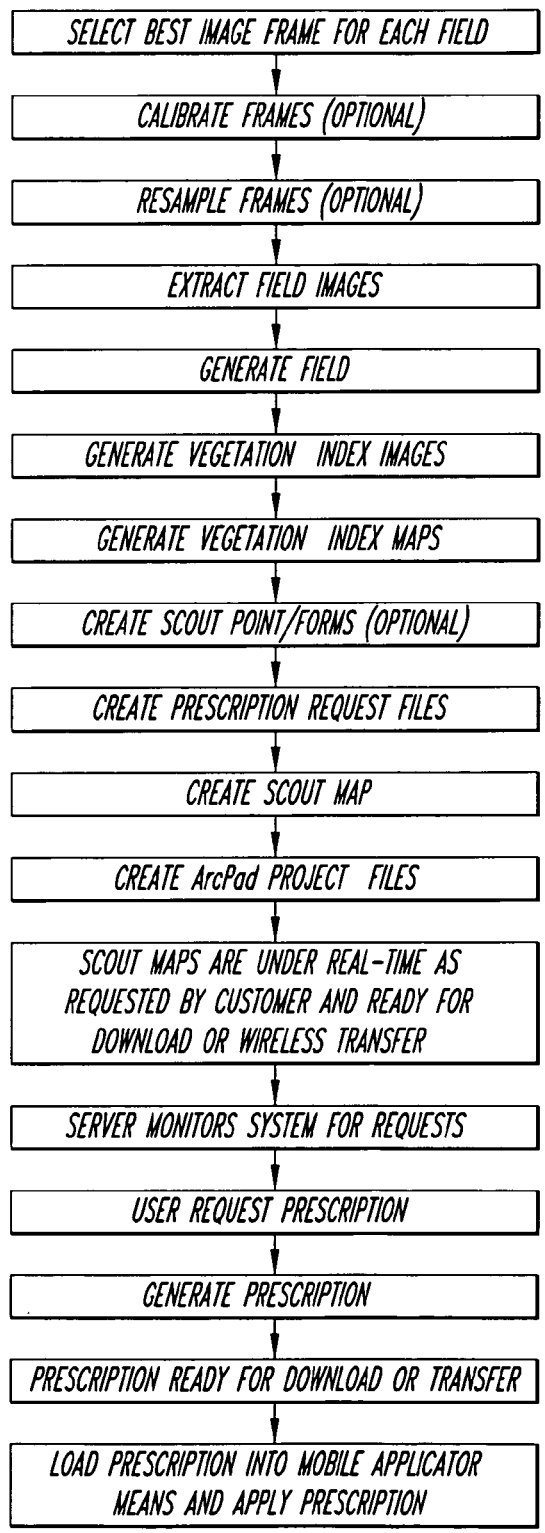
FIG. 3 is a flow chart that shows the processing steps performed by processing software that generates "prescriptions" to control application of agricultural chemicals automatically.

FIG. 3 is a flow chart that shows the steps performed by a software program by which the user can view vegetation index maps, display field data points and request field prescriptions.

Creation of Scout Files. An ArcPad™ project and related set of files or other software format files are created to allow crop condition (including e.g., insect) scouting and prescription requests. These "scout" files are run on a GPS-equipped hand-held computer (such as Compaq iPAQ™), and can be used by on site "scout" existing vegetation conditions and formulate a prescription request. Some or all of the following files may be included: a. NDVI Change Image. This delineates positive and negative vegetation changes from flight to flight. b. Hardcopy maps of the above. These can be created as JPEG images and display the multispectral image and the selected NDVI for each field. c. Prescription Request Table. This is an on-line tabular request form, which allows the user to create variable-rate prescription requests based on the NDVI images described above. (See FIG. 4.) Chemical rates are set for each of the classes. d. Scouting GoTo Points. These points are randomly selected by NDVI class or may be flagged waypoints.

Following data pre-processing and processing, the resultant "scout maps" are accessible to the customer. Scout maps are requested, created and made available to the user via the main web interface. A user 10 selects the desired date of image acquisition upon which to base the scout map. The user 10 then indicates the set of fields or zones to be included. Additionally, a user 10 can select the number of classes, the type of statistics to be applied (local or global) and the type of NDVI (normal or green) to be created. The system will select the optimal frame of imagery associated with each field. If a frame does not exist for the date selected, the system will search imagery acquired on previous dates spanning a predefined number of days.

The term "class" refers to how a scout map is broken down. The process utilizes a 3-band multispectral sensor that acquires digital imagery in three portions of the light spectrum. These are green, red, and near infrared (nir) wavelengths. The red and nir wavelengths are used to generate the scout or vegetation index maps. This process is called a Normalized Difference Vegetation Index or NDVI. NDVI= (nir−red)/(nir+red) Ex: Utilizing raw digital values from image. (160−30)/(160+30)=0.68.

The resulting values from the NDVI algorithm will range from −1 to 1. This range is then divided into subranges utilizing statistical methods such as equal area or equal interval. Our process allows for either method to be chosen and the results are usually similar. A class 1 map is employed for the shortest/thinnest vegetation in a field while a class 7 map can be applied for the most vigorous tallest vegetation in a field. The higher the class number the map will provide the user with greater vegetative breakout. In the preferred embodiment, class 7 is selected by the user 10 for the basic characterizing process.

Figure 4A:
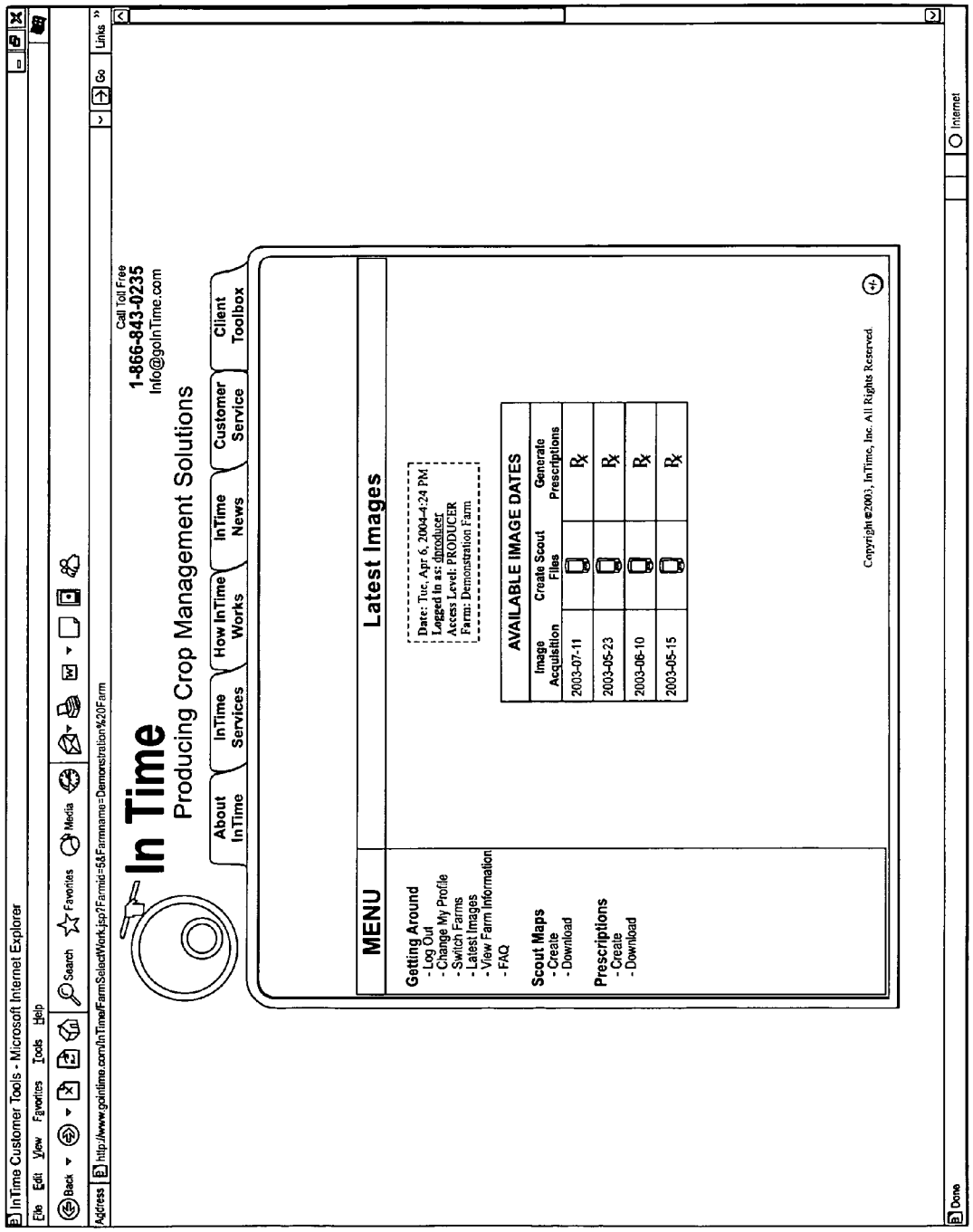
FIGS. 4A–B illustrates the manner of entry of information for creating a scout map.
Figure 4B:
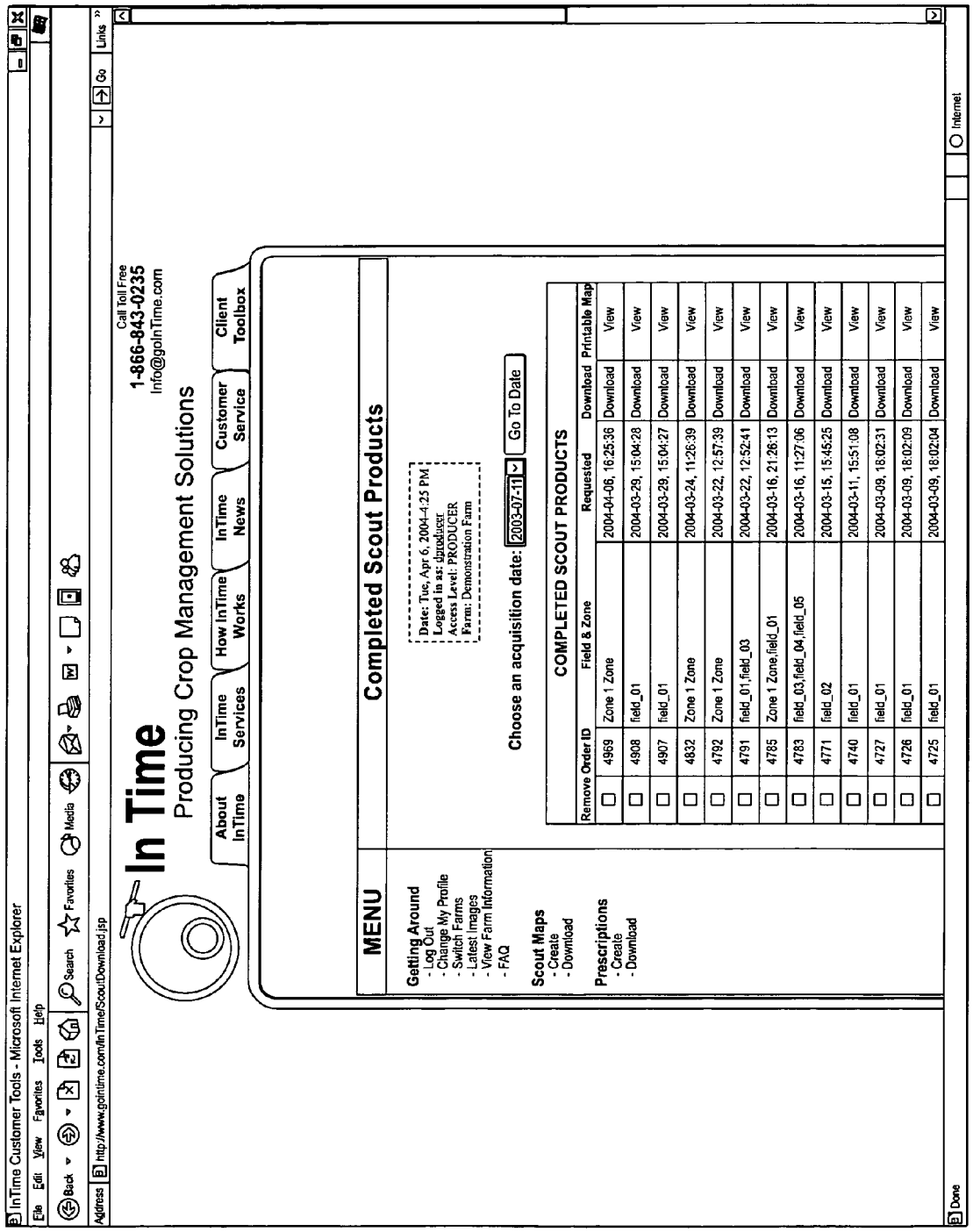

The imagery is cropped to the shape defined by the boundary shape files, and mosoicked into a single Geo-JPG format image product. A report is generated in HTML format. The scout downloads maps off a web site or obtains the maps via wireless transfer (step 203). With reference to FIGS. 4A–B, the web site includes a variety of pages to facilitate a review of the imagery. FIG. 4A provides latest images used to create a scout map of an area. An area is divided into certain zones and fields. The user can select certain zones or fields for the creation of a scout map. FIG. 4B provides completed scout products. This page displays the most current image, collection date in a drop down menu with appropriate fields listed.

Images are acquired at many different altitudes and from a wide array of airborne platforms. An image collected at 12,000 feet above ground level may contain information concerning areas applicable to several different users and within each one of those areas there are many individual fields that are covered. One image may cover two areas (or for example, portions of farms) and include 25+ individual fields. In order to better manage a business, a producer or consultant (end user) may wish to group fields together that adjoin one another or may be in very close proximity. The grouping of these fields is referred to as a zone. In this case, a zone means a group of fields that are adjoined together for processing purposes and treated as one large field instead of many smaller fields. In the scout map generation process, a user has the choice of treating his area as individual fields, zones (fields grouped together) or any combination of fields and zones. This selection may change from date to date depending on chemical application, growth stage, variety, etc.

The next step is to specify the location where the files are to be placed. The file is downloaded into the specified location such as user computer. In the preferred embodiment, the files are in the file format: zip file. After the files have been downloaded and unzipped, they can be copied to a flash card, for example, and used on an iPAQ or printed for field scouts to use.

The scouts load the shapefiles onto the iPAQ handheld computer and use the hard copy and electronic imagery and "goto" points to detect the location of collecting field measurements (step 204). That is, the scout navigates to each of these points using known position determination techniques, and records insect, plant and other data. These data are used to help decide whether a chemical application (e.g., insecticide or fertilizer is warranted, and if so, where and how much should be applied (Step 205).

If a prescription is needed, the scout determines what NDVI levels need to be included for each class in the scout map, and fills out a prescription request form indicating which NDVI levels should be sprayed. These parameters are then translated into a prescription request that is transmitted via website or wireless submission (step 206).

Figure 5A:
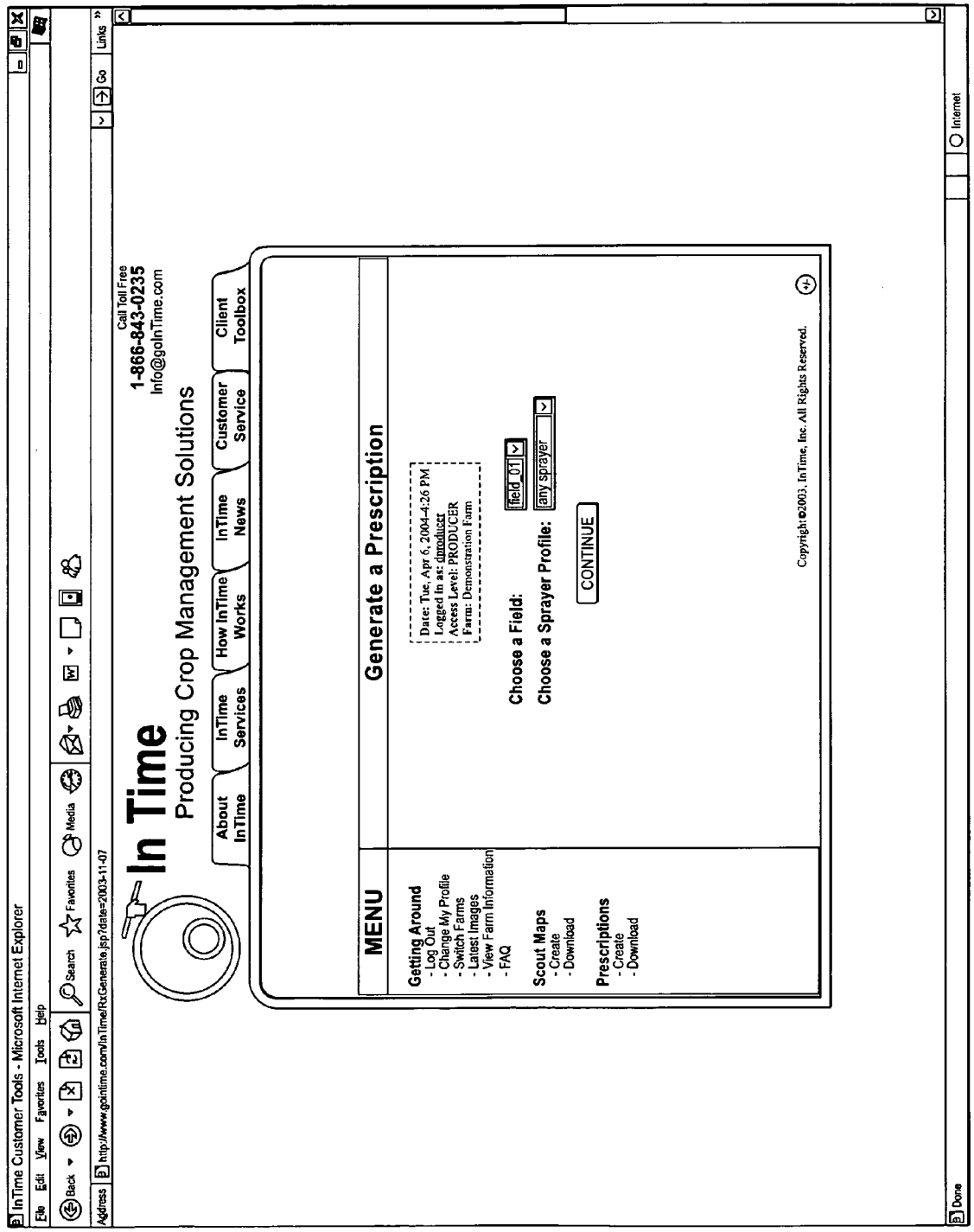
FIGS. 5A–D illustrates the manner of entry of information for submitting a prescription request.
Figure 5B:
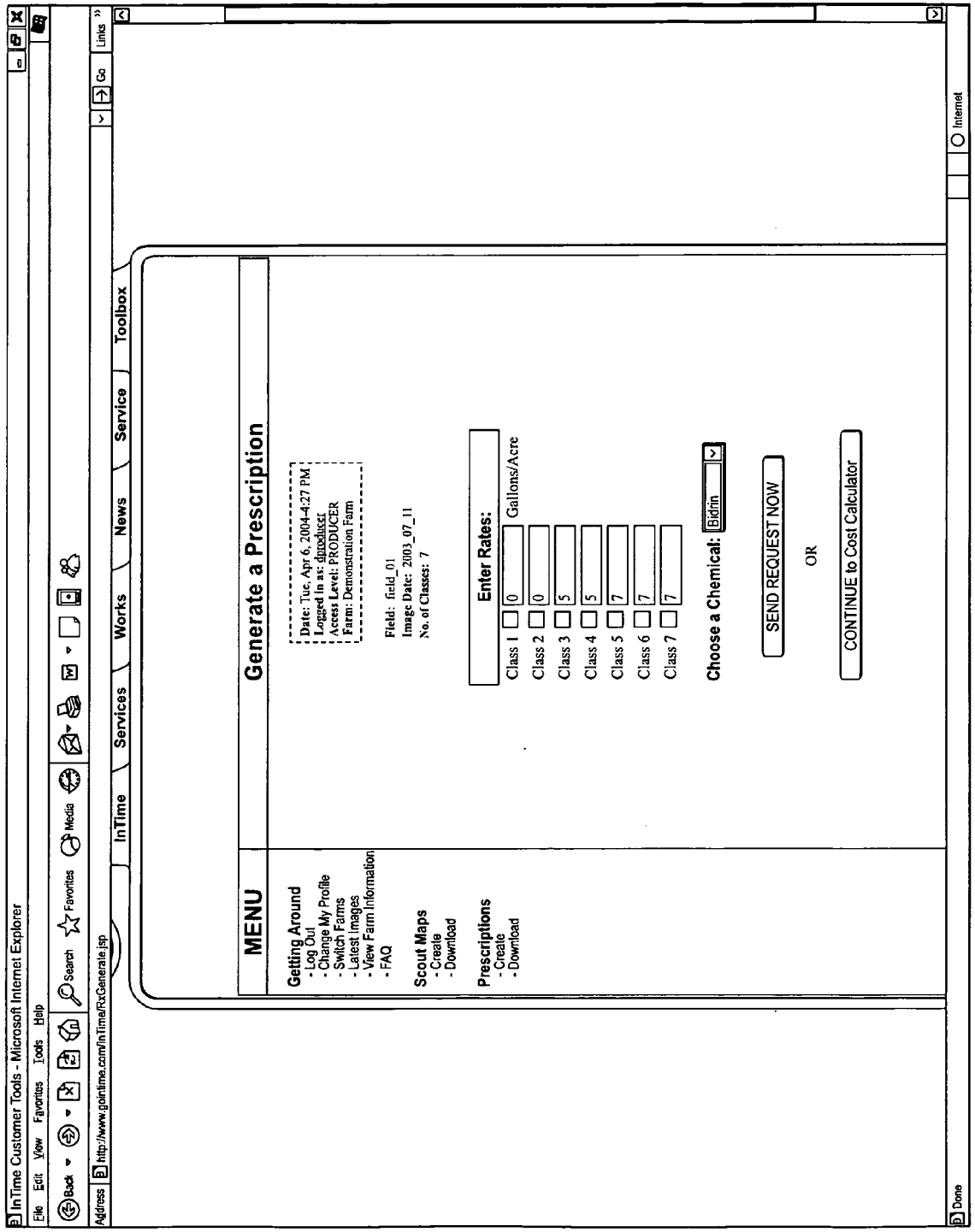

FIG. 5A depicts a page relating to the generation of a prescription. On this page, the user selects the field and sprayer profile. On the next page shown as FIG. 5B, application volumes are assigned to each class. In an alternative embodiment, the user can provide information about the application so an application report can be generated. In this embodiment, the chemical price is entered along with the rate at which the application will be administered at the highest volume (i.e., 1 gallon to 32 acres at 10 GPA). For every class assigned in a scout map, a customer must also request a spray value for each class in the prescription request. For example, a 7 class scout map will result in 7 spray level opportunities in the resulting prescription. An end user has complete control over the desired rates for each class. These can range from 0–infinity and are programmable in a wide variety of volume rates. The volume rate of gallons per acre is the most commonly used. A producer requests a scout map of 7 classes over a particular field.

Example Scenario:

The resulting map is broken down into 7 classes or sub zones of plant vigor. Class 1 may be the shortest/thinnest vegetation in that field while class 7 may be the most vigorous and tallest in the field. The customer may choose prescription spray rates as follows: Class 1=0 gallons, Class 2=3 gallons, Class 4=4 gallons, Class 5=7 gallons, Classes 6 and 7=10 gallon.

Upon prescription generation, the image is broken into the number of classes chosen by the customer. A grid is then overlayed on the image and each grid cell analyzed separately to determine the best application rate to apply to the grid cell. The process chooses the application rate based upon the makeup of the data within the grid cell. Typically for prescriptions utilizing 1 rate and an "Off" rate, the grid cell will be assigned the application rate if 20% of the pixels within the grid cell are classed to a class that received a rate. For prescriptions comprised of more than two rates, the grid cell is assigned the spray rate given to the class that comprises the majority of the grid cell. Following this logic, smaller grid cells will result in a prescription that more closely reflect the original image. Larger grid cells will encompass larger areas, and thus may lose many of the subtle variations observed in the original imagery.

A spray grid is a collection of rectangular, square, or other shaped polygons that are overlayed onto a customer's field or other area of spray prescription interest and used in the development of a spray prescription. These spray grids have an associated coordinate system (X, Y) and a (Z) component which is usually the volume rate of spray. The spray grid size is dictated by the width (X) of the boom, the distance in which a customer would like to change rates (Y), the direction of travel, the speed of travel, and the volume rate of spray (Z) and acts as spray boundary of sorts as the sprayer moves throughout the field. A typical spray grid may be 90 feet wide (width of spray boom) by 60 feet deep (distance in which customer would like to change spray rates). The number of grid cells found in a field or zone prescription is simply dictated by the size of the field or zone and the size of the grid cells. The Global Positioning System (GPS) atop the sprayer reads the X, Y, and Z component of the prescription on the data card or internal memory, compares its geographic location to the prescription changes rates as it leaves one spray grid and enters another throughout the field.

Spray grids are generated using commercially available software. The software asks the user for X and Y parameters while generating the grids. Once completed, the grids are loaded onto a server as a digital file and are associated with each individual field or zone. When a customer requests a prescription, the software program searches the server for that particular fields accompanying spray grid and uses the spray grid as an overlay during the actual prescription building process.

Figure 5C:
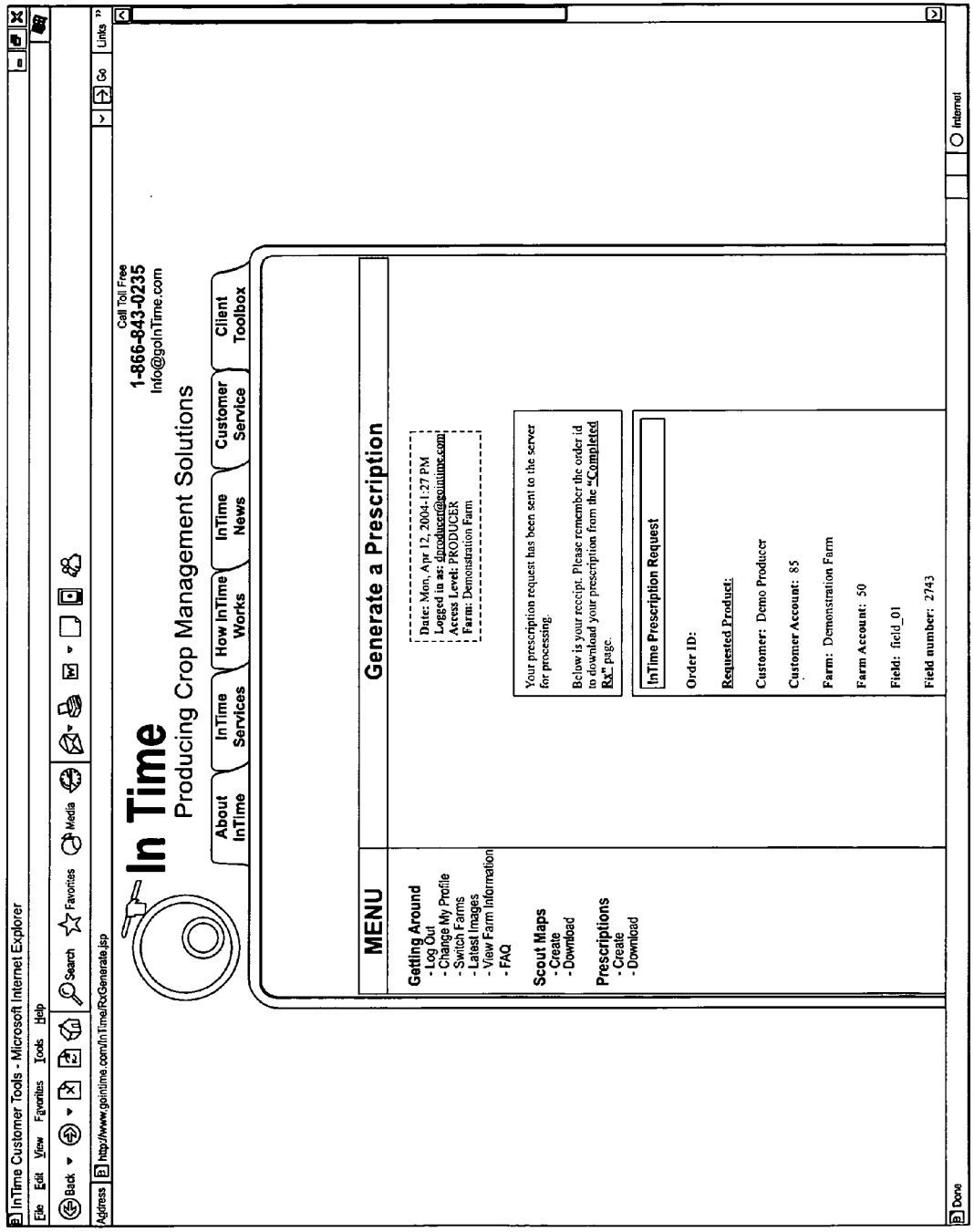
Figure 5D:
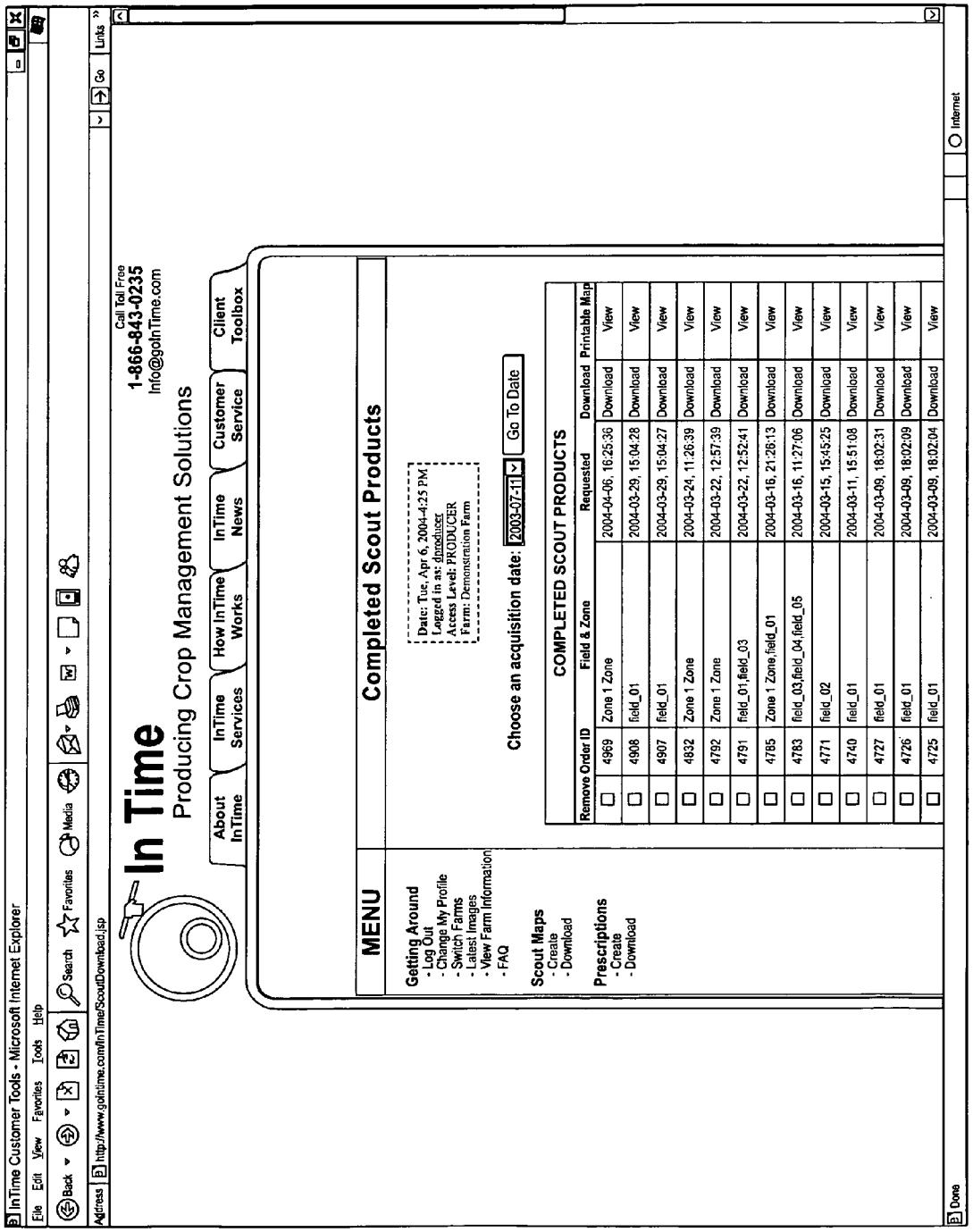
Figure 6B:
FIGS. 6A–D show examples of data files generated according to the invention.
Figure 6B:
Figure 6A:
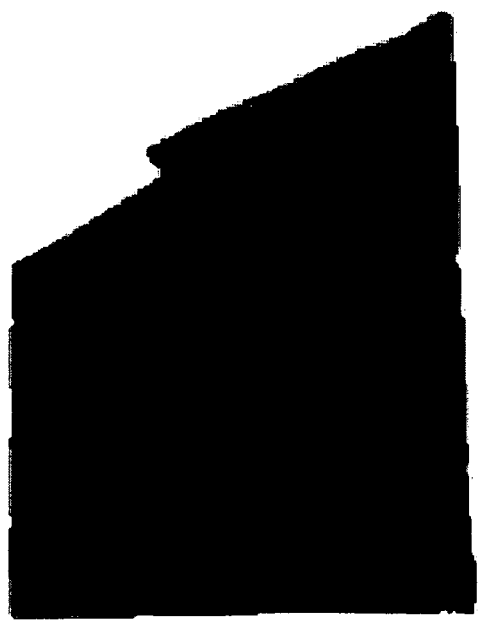
Figure 6D:
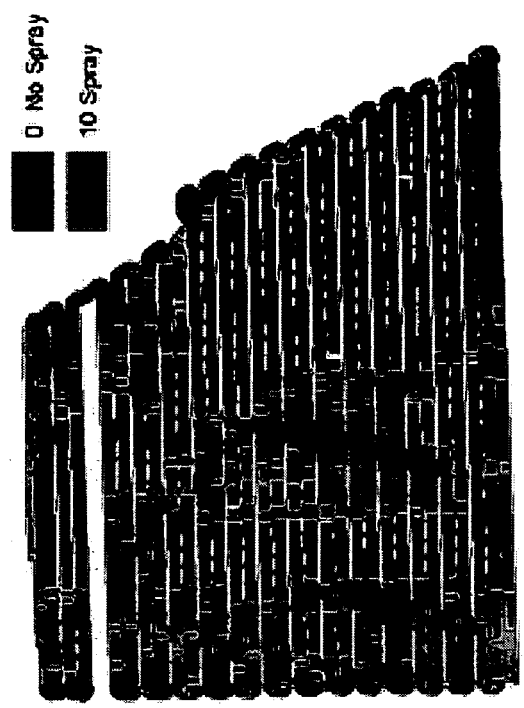
Figure 6C:
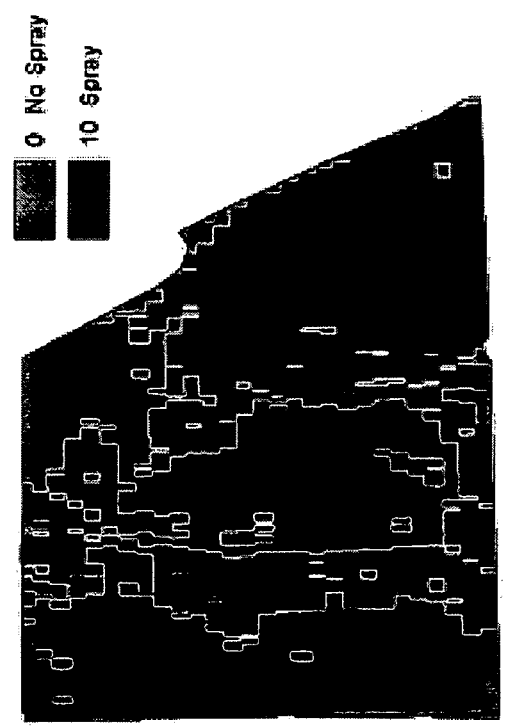
Figure 7A:
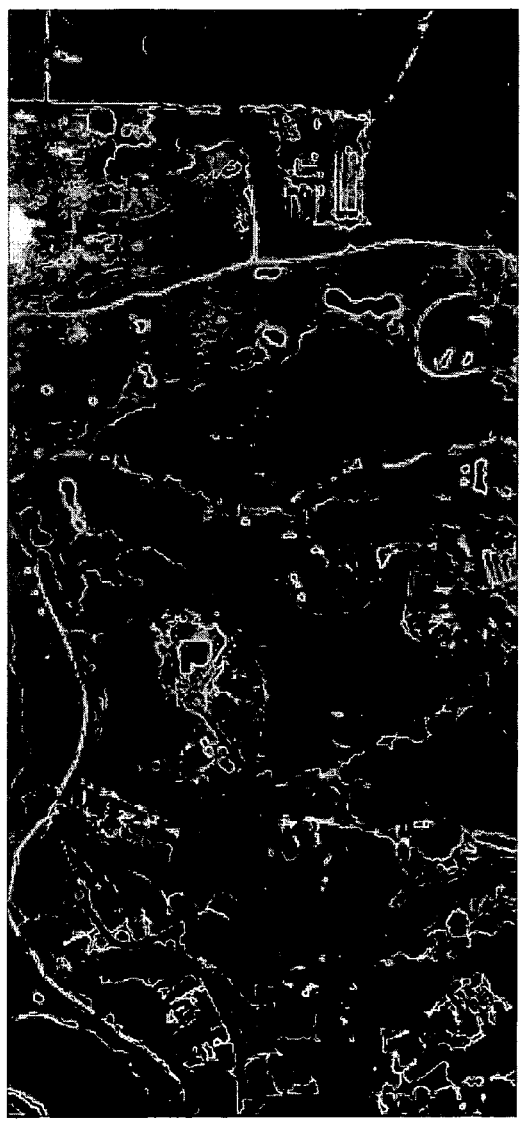
FIGS. 7A–D show examples of data files generated according to the invention.
Figure 7B:
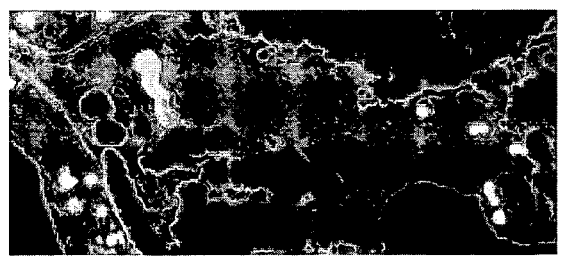
Figure 7D:
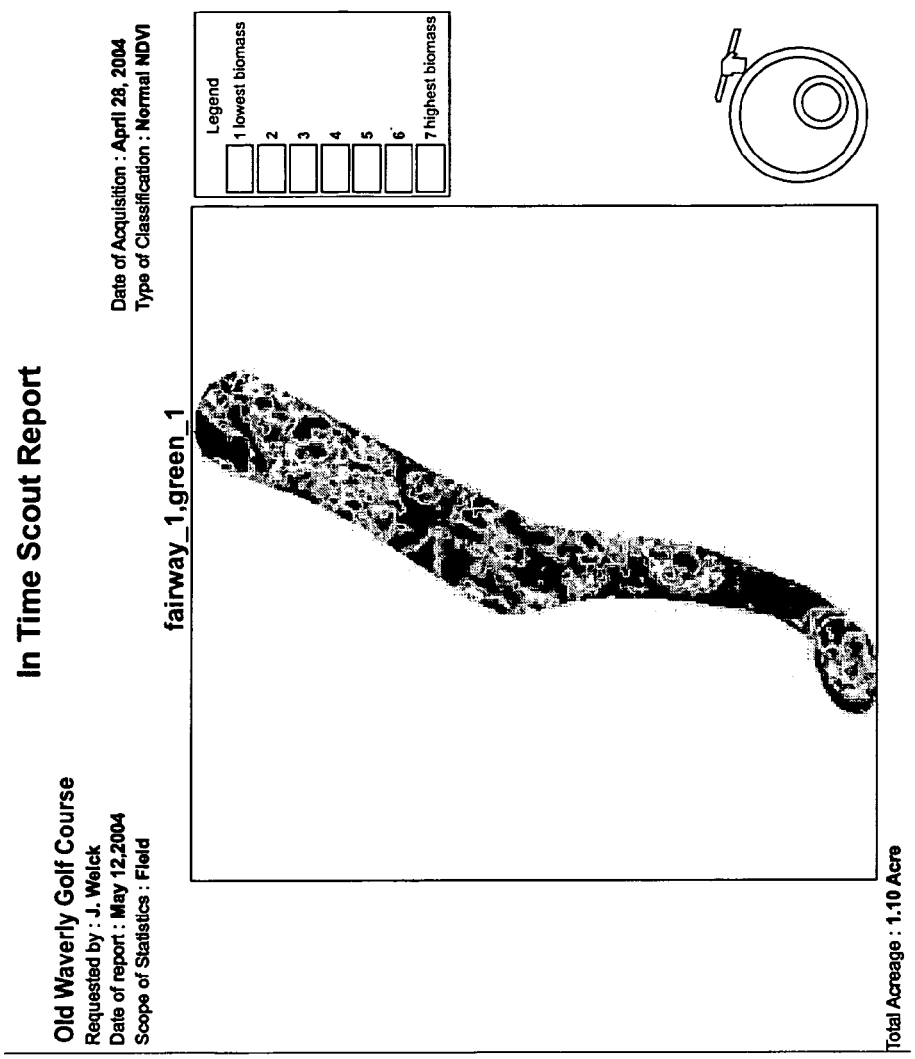
Figure 7C:
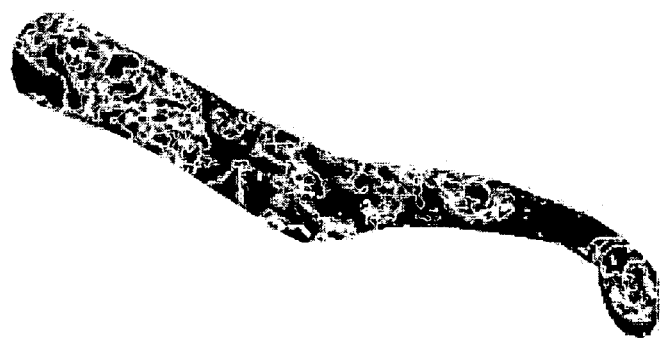

FIG. 5C depicts a page relating to a prescription request receipt. FIG. 5D depicts a page relating to completed prescriptions shown by field/zone and request date. These files can be downloaded to a designated computer from the web site. The next step is to designate the location that the user would like the files to be placed. The file is downloaded into the specified location in a zip file format. After the files have been downloaded and unzipped, they can be copied to a flash card and placed into a spray controller computer for a variable rate application.

The processing software monitors the website prescription request module. When a prescription request table is received, prescriptions are generated (Step 207) and made available on website or transmitted to users via wireless means. The process is automated and the turnaround time can be as little as approximately three minutes using currently available technology. As used herein, the term "prescription" means a set of instructions in a file format that can be read by the controller 7 (FIG. 1), which causes the mobile applicator means 9 to implement the application rates and distribution as requested by the user 10. If sufficient processing capacity is available on site, step 206 may be eliminated, and the prescription itself generated locally.

Once the prescriptions are received, in one embodiment, they are loaded onto a transfer device, such as, but not limited to, PCMICA cards that are then inserted directly into the controller on the mobile application means 9 that directly applies the inputs to the field (Step 208). In another embodiment, the prescription can be transferred using wireless, infrared or other means of data transfer to the mobile applicator means 9.

FIGS. 6.*a–f* show examples of image files generated according to the invention. FIG. 6.*a* is a spectral composite image that is used to create a scout file 6.*b*. ("GoTo" points are not shown.) FIG. 6.*c* shows a prescription map, while FIG. 6.d shows the actual application of chemicals to a field. In the example illustrated in FIG. 6, a saving of 51% was achieved in terms of expenditures for agricultural chemicals applied to a field of 157 acres.

FIGS. 7A–D show examples of image files generated according to this invention. Where the crop is turf grass, golf course superintendents, managers, lawn care professionals, homeowners, sports complex managers, turf farm managers, etc. would be the primary users of this product and process. Following data processing, the end-user would follow the same process for downloading a vegetation or "scout" map, visit the area, conduct ground sampling or verification and develop a management plan based on the scouting map. Once a management plan was decided upon, the user 10 would then generate a prescription request from the server computer system 16 and download the resulting prescription either from the web server or via a wireless transmission directly to an on-site computer 12 or to a variable rate controller aboard the mobile applicator means 9. The user 10 would repeat these steps throughout the season as needed. A chemical input, such as a foliar nutrient, such as Astron™, ProteSyn™, or NOW™(Floratine, Inc., Collierville, Tenn.) are added at a spatially variable rate by the mobile applicator means 9.

Figure 8:
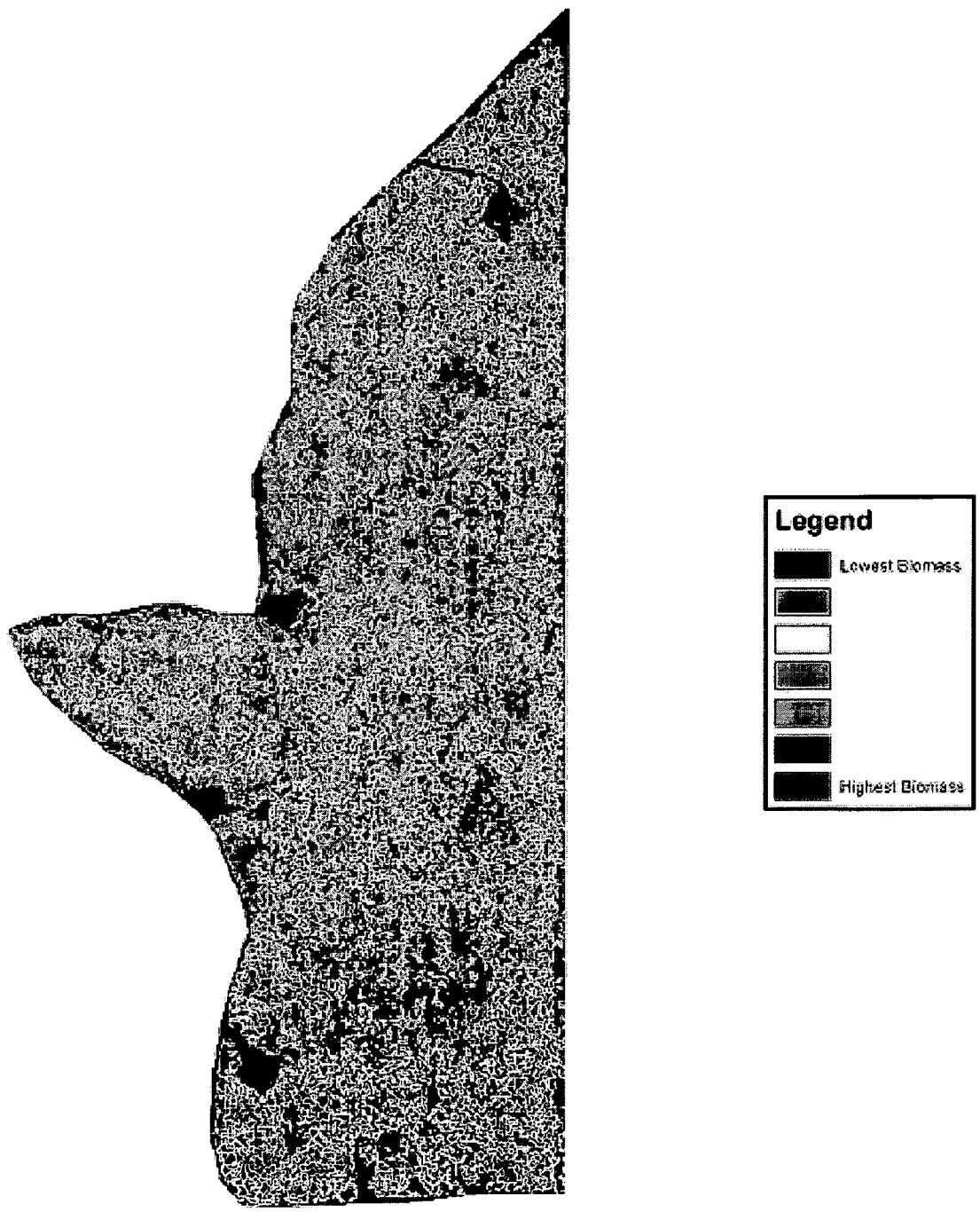
FIG. 8 show examples of data files generated according to the invention.

FIG. 8 shows an example of an image file generated according to this invention. In this image, the area is a tract of timber. Following data processing, the end-user would follow the same process for downloading a vegetation or "scout" map, visit the area, conduct ground sampling or verification and develop a management plan based on the scouting map. Once a management plan was decided upon, the user would then generate a prescription request from our server and download the resulting prescription either from the server computer system 16 or via a wireless transmission directly to an on-site computer 12 or to a variable rate controller aboard the mobile applicator means 9. The user 10 would repeat these steps throughout the season as needed. A chemical input is added at a spatially variable rate by the mobile applicator means 9.

Although the foregoing invention has been described in some detail by way of illustration and example for purposes of clarity of understanding, it will be obvious that certain changes and modifications may be practiced within the scope of the appended claims.

The invention claimed is:

1. A method for generating a prescription for controlling the application of agricultural inputs to an area of cultivated grass, comprising:
   (a) processing remotely sensed digital image data, in the absence of a pretreated reference portion of the area of cultivated grass to characterize spatial variation of currently existing growth vigor of said cultivated grass; and
   (b) generating a prescription for applying said agricultural inputs to said cultivated grass at a spatially variable rate within said area, as a function of said currently existing growth vigor of said cultivated grass.

2. The method according to claim 1, further comprising:
   (a) processing said digital image data to provide a data set comprising spatially distributed vegetation index data which characterizes current cultivated grass vigor throughout said area;
   (b) receiving an inspection of current actual cultivated grass conditions at control points within said area which correlates observed cultivated grass conditions with corresponding data in said data set; and
   (c) generating a prescription based on said current observed cultivated grass conditions and said spatially distributed vegetation index data in said data set for controlling application of said agricultural inputs.

3. The method of claim 1 wherein in said step of generating a prescription comprises:
   (a) obtaining a spray grid comprised of a plurality of grid cells for an area; and
   (b) assigning the application rate for each grid cell of said plurality of grid cells.

4. A method for generating a prescription for controlling application of agricultural inputs to an area of cultivated grass comprising:
   (a) acquiring remotely sensed multispectral digital data which characterizes currently existing conditions of said cultivated grass throughout said area, in the absence of a pretreated reference portion of the area;
   (b) processing said multispectral digital data to generate a digital map of said area, which map characterizes spatially differentiated existing growth vigor of said cultivated grass within said area; and
   (c) generating a prescription for applying agricultural inputs to said cultivated grass at an application rate which varies specially throughout said area as a function of spatially distributed current cultivated grass vigor based on information contained in said map.

5. The method according to claim 4, wherein said processing step comprises:
   (a) generating a data set comprising spatially distributed vegetation index data which characterizes said cultivated grass throughout said area;
   (b) entering said data set into a computer; and
   (c) entering information into said computer that is indicative of observed cultivated grass conditions at selected locations within said area and correlating said information with data in said data set.

6. The method according to claim 5, further comprising:
   (a) receiving a prescription request as a function of said observed cultivated grass conditions correlated with said spatially distributed vegetation index data in said data set; and
   (b) said data processor generating said prescription, based on a prescription request and on said data in said data set.

7. The method according to claim 6, wherein said data processing site is at a location remote from said area.

8. A system for application of agricultural inputs to an area of cultivated grass, comprising:
   (a) means for obtaining multispectral digital image data that characterize spatial variation of currently existing growth vigor of said cultivated grass at a point in time;
   (b) centrally located data processing means for processing said multispectral digital image data to provide a data set comprising spatially distributed vegetation index data which characterizes currently existing growth vigor of said cultivated grass throughout said area at said point in time, and for storing and communicating said data set;
   (c) a mobile applicator means for applying said agriculture inputs to said area at a spatially variable rate; and
   (d) a control unit which is programmed to control spatial variation of an application rate of said agricultural inputs by a mobile applicator means, as a function of said currently existing growth vigor of said cultivated grass.

9. The system according to claim 8, further comprising:
(a) a communication medium for transmitting said spatially distributed vegetation index data to an on-site location in proximity to said area; and
(b) a portable processor programmed to receive and display said spatially distributed vegetation index data, receive entry of localized cultivated grass information at predetermined points in said area based on a physical on-site inspection, and prepare prescription requests based on currently existing growth vigor of said cultivated grass as defined in said spatially distributed vegetation index data, said localized cultivated grass information and inputs by a scout situated at said on-site location; wherein said centrally located data processing means includes means for generating a prescription in response to said prescription request, and a communication medium for communicating said prescription to said controller.

10. The system according to claim 9, wherein said second communication medium comprises: a digital electronic means for sending said prescription to said on-site location; and a storage medium which receives and stores said prescription in a form that is readable by said control unit.

11. A method for controlling application of agricultural inputs to a crop in an area within said crop is selected from the group consisting of cultivated grass and timber, comprising:
(a) acquiring a first digital image data set characterizing spatial variation of growth vigor over said area, for a currently existing crop which is growing in said area, in the absence of a pretreated reference portion of the area;
(b) processing said first digital data set to generate a second data set comprising spatially distributed vegetation index data which characterize current growth vigor of said crop throughout said area, said second data set including at least a scout map identifying control points in said area;
(c) transmitting said second data set to a computer situated in proximity to said area;
(d) receiving data characterizing currently existing growth vigor of said crop at said control points, based on a visual inspection of said control points; said computer receiving a prescription request, based on said second data set, said data based on visual inspection, and inputs from an operator of the computer;
(e) receiving said prescription request to said data processing site; and
(f) generating prescription in response to said prescription request wherein said prescription controls the application of said agricultural inputs to said area, as a function of currently existing growth vigor of said crop.

12. A method for obtaining a prescription for controlling application of agricultural inputs to a crop in an area wherein said crop is selected from a group consisting of cultivated grass and timber comprising:
(a) acquiring near real time crop vigor data at at least one point in time during a growing season of said crop, said crop vigor data identifying current actual crop development as of said at least one point in time during the growing season, in the absence of a pretreated reference portion of the area; and
(b) using said crop vigor data to obtain at least one time variable and spatially variable dynamic crop prescription based on said actual crop development during said growing season; wherein said prescription controls the application of agricultural inputs to said crop during said growing season, to reflect said actual crop development.

13. A computerized method for spatially variable rate application of agricultural chemicals based on remotely sensed vegetation data for an area, the method comprising:
(a) opening a web browser on a user computer system;
(b) establishing a secure electronic data network connection between the user computer system and a server computer system;
(c) referencing latest remotely sensed vegetation data for an area in the absence of a pretreated reference portion of said area;
(d) reviewing a scout map for an area; and
(e) reviewing a prescription maps for an area; and
(f) applying agricultural chemicals at a spatially variable rate based on said prescription.

14. The method of claim 13 wherein said area is a zone.

15. The method of claim 13 wherein said area is a field.

16. The computerized method of claim 13 wherein the server computer system includes:
(a) a digital file of user fields.

17. The computerized method of claim 13 wherein the server computer system includes:
(a) a digital file of user zones.

18. The computerized method of claim 13 wherein the server computer system includes:
(a) a digital file of user spray grids.

19. The computerized method of claim 13 wherein said electronic data network is the Internet.

20. The computerized method of claim 13 wherein said prescription is available on a website.

21. The computerized method of claim 13 wherein said prescription is transmitted directly to the controller of the mobile applicator means.

22. A computerized implemented method for spatially variable application of agricultural chemicals based on remotely sensed vegetation data for an area, the method comprising:
(a) opening a web browser on a user computer system;
(b) establishing a secure electronic data network connection between the user computer system and a server computer system;
(c) referencing latest remotely sensed vegetation data for an area in the absence of a pretreated reference portion of said area with said web browser to create a scout map;
(d) using said scout map to determine current actual crop conditions at control points within said area;
(e) entering a prescription request with said web browser; and
(f) receiving a prescription as a function of the current crop conditions.

23. A computer implemented method for generating a prescription for controlling the application of agricultural inputs to crops growing in an area comprising:
(a) providing a website for processing and retrieval of information by a remote user;
(b) providing on said website an electronic image comprising spatially distributed vegetation index which characterizes current growth vigor of said crops throughout said area which is derived from remotely sensed digital image data; and
(c) providing on said website at least one electronic image eliciting information to generate a prescription for controlling the application of agricultural inputs to an area.

24. The method of claim 23 wherein said electronic image is a scout map.

25. The method of claim 23 wherein the step of providing on said website at least one electronic image eliciting information to generate a prescription comprises selecting a field profile.

26. The method of claim 23 wherein the step of providing on said website at least one electronic image eliciting information to generate a prescription comprises selecting a sprayer profile.

27. The method of claim 23 wherein the step of providing on said website at least one electronic image eliciting information to generate a prescription includes selecting a chemical to be applied.

28. The method of claim 27 further comprising the step of calculating the cost of the chemical to be applied.

29. The method of claim 23 comprising associating a said area with a spray grid.

30. A website on the Internet for generating a prescription for controlling the application of agricultural inputs to crops at a spatially variable rate in an area comprising:
(a) a web page providing remotely sensed digital image data for at least one area;
(b) a web page providing a scout map, wherein said scout map includes spatially distributed vegetation index data processed from said remotely sensed digital image data for at least one area;
(c) a web page providing a request for a prescription based on observed crop conditions correlated with said spatially distributed vegetation index data; and
(d) a web page providing a prescription for controlling the application of agricultural inputs to an area at a spatially variable rate.

31. The website of claim 30 wherein said area is a zone.

32. The website of claim 30 wherein said area is a field.

* * * * *